J. O. ALMEN.
INTERNAL COMBUSTION ENGINE.
APPLICATION FILED SEPT. 17, 1917.
Reissued Sept. 5, 1922.
15,442.
2 SHEETS—SHEET 1.
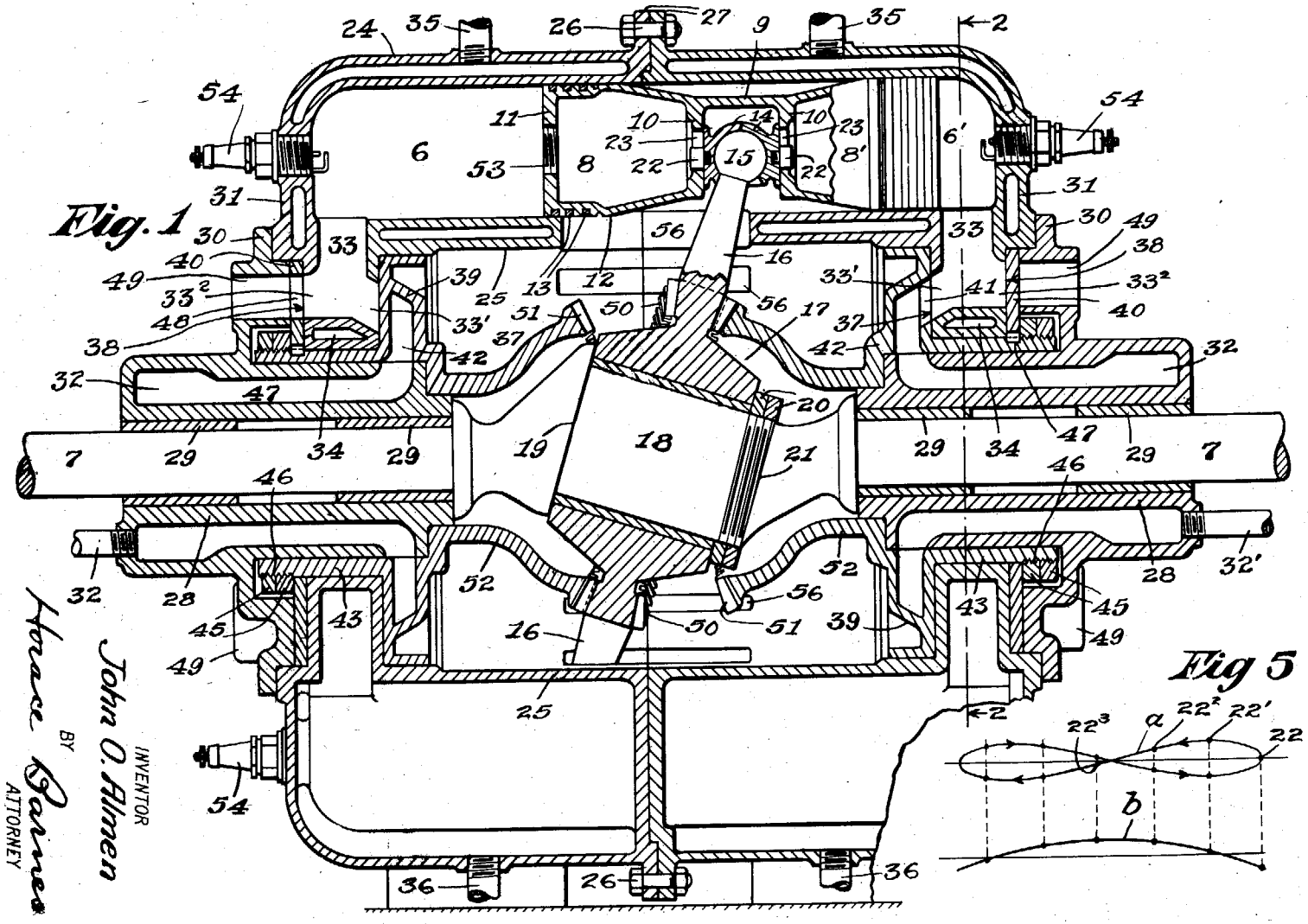
INVENTOR
John O. Almen
BY
Horace Barnes
ATTORNEY J. O. ALMEN.
INTERNAL COMBUSTION ENGINE.
APPLICATION FILED SEPT. 17, 1917.
Reissued Sept. 5, 1922.
15,442.
2 SHEETS—SHEET 2.
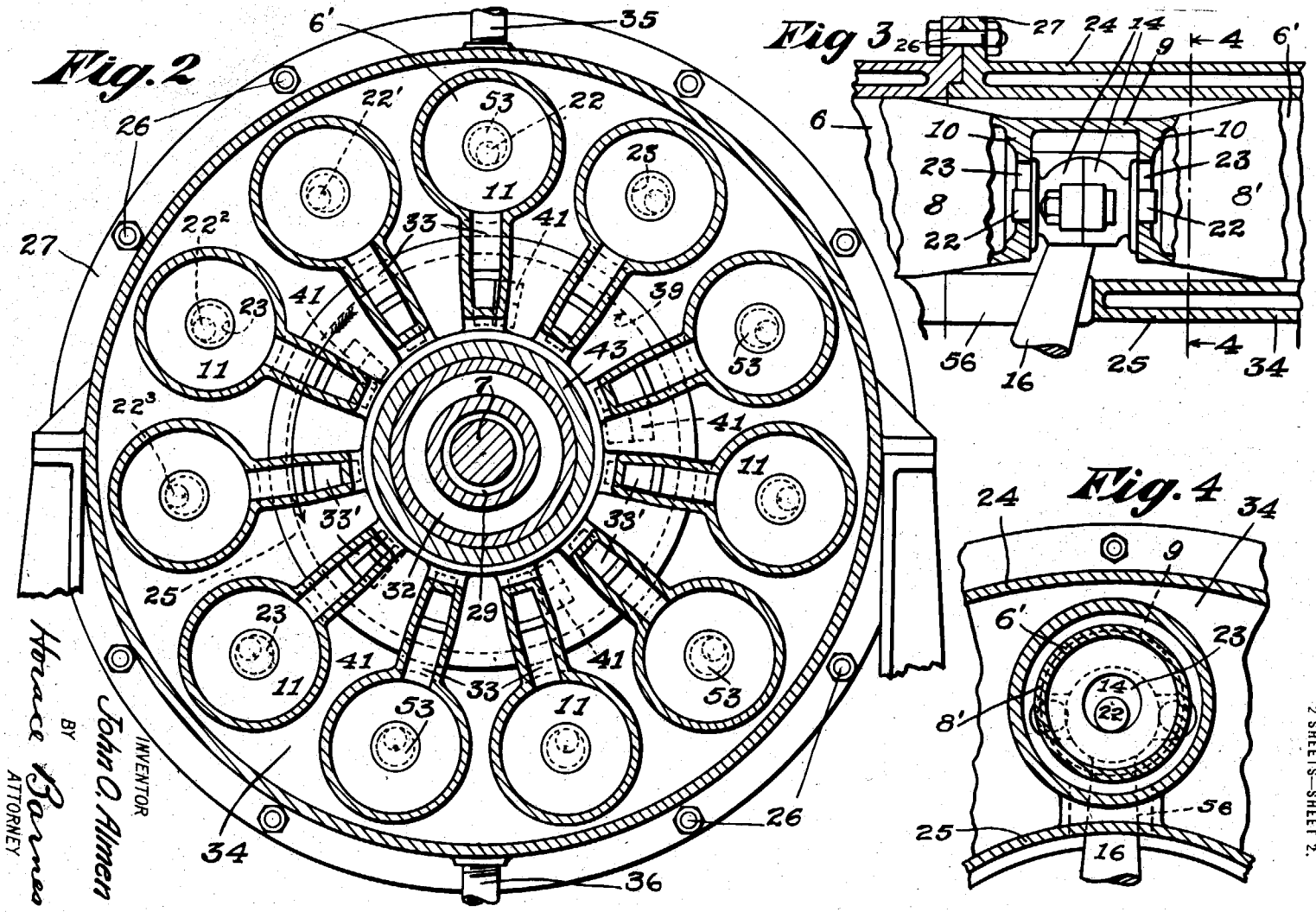
INVENTOR
John O. Almen
BY
Horace Barnes
ATTORNEY Reissued Sept. 5, 1922. Re. 15,442

UNITED STATES PATENT OFFICE.

JOHN O. ALMEN, OF SEATTLE, WASHINGTON, ASSIGNOR TO ALMEN-CROSBY MOTORS CO., INC., OF SEATTLE, WASHINGTON, A CORPORATION OF WASHINGTON.

INTERNAL-COMBUSTION ENGINE.

Original No. 1,233,635, dated July 17, 1917, Serial No. 114,982, filed August 15, 1916. Application for reissue filed September 17, 1917. Serial No. 191,876.

*To all whom it may concern:*

Be it known that I, JOHN O. ALMEN, a citizen of the United States, residing at Seattle, in the county of King and State of Washington, have invented certain new and useful Improvements in Internal-Combustion Engines, of which the following is a specification.

This invention relates to internal combustion engines and, while it is intended more especially for explosive engines, it includes devices which may be employed in steam engines.

The object of my invention is the perfecting of engines by the provision of novel means whereby the motive power may be applied more directly and efficiently.

The invention consists in the novel construction, arrangement and combination of parts, as will be hereinafter described and claimed.

In the accompanying drawings, Figure 1 is a longitudinal vertical section of an engine embodying my improvements. Fig. 2 is a transverse vertical section through 2—2 of Fig. 1. Fig. 3 is a detail view shown partly in section and partly in side elevation to an enlarged scale, of elements illustrated in Fig. 1. Fig. 4 is a section through 4—4 of Fig. 3. Fig. 5 is a diagram of the path traveled by the ball-and-socket connection between one of the arms of the rocker and the twin pistons therefor.

In carrying out the present invention, I employ a plurality of axially aligned cylinders 6 arranged concentrically and in parallel relations to the engine shaft 7. For each of these cylinders is provided pistons, each of which is formed of two members 8 and 8′ integrally connected in spaced relation by a plate element 9.

As shown in Fig. 1, the various pistons are desirably formed with chambers between the adjacent inner and outer walls 10 and 11, and a peripheral wall 12, the latter being grooved to accommodate the usual packing rings 13. Between the walls 10 of a piston is a block 14 having a spherical recess which serves as a socket bearing for correspondingly shaped extremity 15 of the respective arm 16 of a rocker-head, 17. The latter is mounted for relative rotary movements on a journal 18 provided in the shaft 7, said journal having its axis from the axis of the main portion of the shaft. The hub of the rocker is confined between a shoulder 19 and lock nuts 20 engaging screw threads, indicated by 21 in Fig. 1.

By reason of mounting the rocker head on an inclined bearing of the shaft, as above explained, and the action of the ball-and-socket joints with the blocks 14, the reciprocation of the power-driven pistons will impart wabbling motions to the rocker-head which, in turn, effects the rotation of the shaft.

The arcuate movement of a pivotal point of one of the ball-and-socket connections between an arm extremity 15 and the block 14, will appear substantially as shown in Fig. 5 where the lines *a* and *b* designate the respective paths of such a point when viewed from the end and side of the arm; that is to say, its locus will describe a transverse course of substantially that of the numeral eight (8) when vibrating in an arcuate path *b* about the center of the rocker-head journal 18.

To accommodate such movements and also for the purpose of obviating rotary motion of the rocker-head, axially aligned studs 22 are provided for the respective blocks 14, such axis extending diametrically through the balls 15. Said studs extend into circular apertures 23 provided in the adjacent piston walls 10. The diameters of the apertures 23 are such that the studs in revolving about the centers thereof will maintain circumferential contact with the peripheries of the respective apertures.

These revolving or orbital movements of the studs will be best understood from an inspection of Fig. 2, wherein they are shown by broken lines in progressive order for an engine provided with eleven cylinders, and particularly designated by 22′, $22^2$, $22^3$, etc., when occupying positions designated in Fig. 5. The cylinders are formed integral with a frame or casing including outer and inner peripheral walls 24 and 25 which are, for convenience, cast in two parts and joined at about the mid-length of the casing by means of coupling bolts 26 engaging flanges 27 provided on the respective members.

28 represents journal boxes for the shaft 7 which may be bushed with suitable anti-friction bearing material as indicated by 29. The said boxes are provided with peripheral flange elements 30 for rigidly securing the same to the end elements 31 of the aforesaid casing, and are chambered as at 32, to serve as manifolds, so-called, with respect to a carbureter or an equivalent, not shown, with which the manifold chambers are connected by pipes 32′.

For each end of the cylinders is a passage 33 extending radially of the casing and terminating in branches 33′ and 33² which respectively serve as an inlet port for the explosive agent and as an exhaust port for the combustion products. More particularly, the various passages 33 and the branches thereof are included in tubular elements which, as best shown in Fig. 2, extend into the space 34 which is utilized by circulatory cooling water admitted and discharged through pipe connection 35 and 36, Fig. 1.

The faces 37 and 38 of said tubular elements are machined to present plate surfaces against which the rotary inlet valves 39 and outlet valves 40 are juxtaposed. The inlet valves are in the nature of wheels having suitably disposed ports 41 which, upon occasion, register with the ports afforded by branches 33′ and communicate by means of cavity 42 with the adjacent manifold chambers 32.

The above mentioned valves 39 are preferably formed integral with hub elements 43 having relatively large bearing surfaces on the journal boxes 28. The valves 40 which serve for controlling the engine exhaust are in the nature of annular plates secured to the hub elements 43 by means of jam nuts 45 engaging screw-threads 46 provided therefor on the hub elements. The valves 40 are also secured against independent rotary movements by keys 47 and are provided with suitably disposed ports 48 for regulating the accurrence of the openings between the outlet branches 33² and delivery ducts 49 which open into the external atmosphere.

The intake and exhaust valves for the cylinders at each end of the casing are rotated in unison by means of bevel gears 50 provided at opposite sides of the rocker-head operatively engaging the teeth of bevel gears 51 provided on extensions 52 of the respective pairs of complementary valves.

The motion of the rocker head is of a wabbling character and in order to transmit therefrom rotary motion to the valves the gears for the latter are provided with a different number of teeth from those of the rocker-head gears 50.

53 represents stoppers removably secured in holes provided in the piston ends 11 to render the studs 22 accessible. 54 represents sparking plugs by which the combustible charges in the various cylinders are fired through the instrumentality of the electric current applied by an ordinary or suitable ignition apparatus, which it is not deemed necessary to illustrate.

In operation, the valves at each end of the engine are rotated in unison through the office of the gears 51 and 50, when the latter are influenced by the wabbling motions afforded to the rocker-head by the reciprocation of the pistons.

In the present instance, the pistons are acted upon from opposite ends and in such manner and sequence that the previously admitted charges are compressed in the respective cylinders during the explosive strokes in the complementary cylinders.

By such devices, the force requisite for compressing the charges is applied directly or approximately so, and not through the intermediary of the rocker-head from a cylinder at one side of the shaft to another at the other side. In the present invention the rocker-head is utilized only to drive the shaft and the valves.

The pistons are coupled to the rocker-head arms by universal joints comprising the ball-and-socket connections between the arms and the blocks, while the studs 22 acting in the piston apertures 23, without causing the blocks to rotate, afford orbital motions to them and permit the adjacent ends of the associated rocker arms to vibrate laterally in relation to the axes of the respective pistons in order to conform to the loci due to the wabbling effects of the rocker-head. Such compensating devices contribute to the high efficiency of my improved engine.

Another notable factor of the engine is the disposition of the adjacent inlet and exhaust valves 39 and 40 at opposite sides of the passages 33 leading to and from the respective cylinder ends whereby the pressures obtaining therein are balanced to eliminate friction between the valves and the seats 37 and 38.

The water circulation obtains throughout the space in which the cylinders and conduits 33 are located to cool the same. The space within the casing's inner wall 25 and the interiors of the cylinders with which communication is had by passages 56 are kept free from water and may serve as a receptacle of a lubricant.

What I claim is—

1. In an engine, a driving shaft, a plurality of parallel cylinders disposed concentrically about said shaft, passages at both ends of the cylinders for the inlet of combustible charges and for exhausting the gaseous products thereof, pistons for the respective cylinders, a rocker-head mounted on said shaft for wabbling movements, operative connections between the rocker-head and each of the pistons, and between the ends of the latter, rotary valves for controlling the inlet and exhaust gases, and means engaging the rocker-head whereby the wabbling movements of the latter will effect the operation of said valves.

2. In an engine of the class described, the combination with a drive shaft, cylinders, and pistons therefor, of a rocker-head mounted on the shaft for wabbling movements, said rocker-head being provided with radially disposed arms having spherical extremities, blocks provided with sockets to receive said extremities, and studs extending from said blocks into apertures provided in the respective pistons, said apertures being of greater diameters than the studs to afford orbital movements of the latter within such recesses during the reciprocatory travel of the respective pistons.

3. In an engine of the class described the combination with a drive shaft, cylinders, and pistons therefor, of a rocker-head mounted on the shaft for wabbling movements, said rocker-head being provided with radially disposed arms having spherical extremities, blocks connected with the pistons for movements axially therewith, said blocks being provided with sockets to receive the spherical ends of the respective rocker-head arms, and means for connecting said pistons with the blocks whereby the latter are afforded limited revoluble movements.

4. In an engine of the class described, a drive shaft, a plurality of parallel cylinders disposed concentrically about said shaft, said cylinders being provided with gas inlet and exhaust ports at both ends thereof, rotary valves for said ports, pistons operable within the cylinders, means connecting the pistons with the shaft for rotating the shaft through the explosion of combustibles alternately at both ends of the cylinders and means actuated by the aforesaid means for rotating the respective valves.

5. In an engine of the class described, a driving shaft, a rocker-head mounted thereon, a plurality of parallel cylinders disposed concentrically about the shaft and provided with radially disposed inlet and exhaust openings, pistons for said cylinders, means for connecting the pistons with the rocker-head for driving the shaft, and a valve rotated from the rocker-head and disposed at opposite sides of the aforesaid openings for balancing end pressures obtaining from the gases within such openings.

6. In an engine, a driving shaft having a relatively inclined portion, a plurality of cylinders disposed in parallel relations and concentrically to the shaft, each of said cylinders being provided at each of its ends with an inlet and exhaust passage extending in an approximately radial direction from the respective cylinder, inlet and exhaust valves rigidly connected together and disposed at opposite sides of the respective passages to neutralize any end pressure applied to the valves with regard to the valve seats, pistons for the cylinders, a rocker-head journaled on the inclined portion of said shaft, operative connection between the rocker-head and the pistons between the ends of the latter, and means for actuating said valves.

7. In an engine, a driving shaft having a relatively inclined portion, a plurality of cylinders disposed in parallel relations and concentrically to the shaft each of said cylinders being provided at each of its ends with an inlet and exhaust passage extending in an approximately radial direction from the respective cylinder, inlet and exhaust valves rigidly connected together and disposed at opposite sides of the respective passages to neutralize any end pressure applied to the valves with regard to the valve seats, pistons for the cylinders, a rocker-head journaled on the inclined portion of said shaft, operative connection between the rocker-head and the pistons between the ends of the latter, and means influenced by the wabbling movements of said rocker-head for actuating said valves.

8. In an engine of the class described, including a shaft, a plurality of pistons arranged in circular relation about said shaft, a rocker-head mounted upon said shaft having arms operatively connected to said pistons, said connections permitting the arm bearings to follow a transverse course of substantially that of a figure 8 and restricted thereto when vibrating in an arcuate path about the center of said rocker-head.

9. In an engine of the class described, the combination with a drive shaft, cylinders, and pistons therefor, of a rocker-head mounted for wabbling movements on the shaft, and operative connections between said pistons and the rocker-head admitting relative orbital movements and restricted thereto in such connections with respect to the axis of the respective pistons during the reciprocatory travel of the latter.

10. An engine of the class described, including a shaft, a plurality of pairs of axially aligned pistons arranged in circular relation about said shaft, each pair of pistons being rigidly connected together, a block slidably mounted between each said pair of pistons, and a rocker-head mounted upon said shaft provided with arms operatively connected to said blocks admitting relative orbital movements and restricted thereto.

11. An engine of the class described, including a shaft, a plurality of pairs of axially aligned pistons arranged in circular relation about said shaft, each pair of pistons being rigidly connected together, a block slidably mounted between each said pair of pistons, a rocker-head mounted upon said shaft provided with arms operatively connected to said blocks, and means whereby said block is guided in a circular path during the reciprocation of said pistons.

12. An engine of the class described, including a plurality of cylinders arranged in circular relation, each provided with an internally directed radially disposed passage for the inlet and exhaust of gases, a valve rotatably mounted within the circle of said cylinders provided with flanges extending in radial directions upon axially opposite sides of said passages and formed with inlet and exhaust openings, respectively.

Signed at Seattle, Washington, this 22nd day of August, 1917.

JOHN O. ALMEN.